(12) United States Patent
Mundra et al.

(10) Patent No.: US 11,809,610 B2
(45) Date of Patent: Nov. 7, 2023

(54) HARDWARE PROTECTION OF INLINE CRYPTOGRAPHIC PROCESSOR

(71) Applicant: Texas Instruments Incorporated, Dallas, TX (US)

(72) Inventors: Amritpal S. Mundra, Allen, TX (US); William C. Wallace, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 10 days.

(21) Appl. No.: 14/305,713

(22) Filed: Jun. 16, 2014

(65) Prior Publication Data
US 2015/0363332 A1 Dec. 17, 2015

(51) Int. Cl.
G06F 21/79 (2013.01)
G06F 12/14 (2006.01)
G06F 21/62 (2013.01)
G06F 21/60 (2013.01)

(52) U.S. Cl.
CPC .......... *G06F 21/79* (2013.01); *G06F 12/1408* (2013.01); *G06F 21/606* (2013.01); *G06F 21/62* (2013.01); *G06F 2221/2107* (2013.01); *G06F 2221/2125* (2013.01)

(58) Field of Classification Search
CPC .. G06F 21/62; G06F 21/6209; G06F 21/6218; G06F 21/52; G06F 21/54; G06F 2221/2107; G06F 12/1408; G06F 2212/1052
See application file for complete search history.

(56) References Cited

U.S. PATENT DOCUMENTS

| | | | | |
|---|---|---|---|---|
| 4,722,047 A * | 1/1988 | Chan | ................... | G06F 12/0292 711/201 |
| 4,887,267 A * | 12/1989 | Kanuma | ........ | G01R 31/318505 714/726 |
| 5,528,610 A * | 6/1996 | Edler | ............. | G01R 31/318558 324/76.11 |
| 5,848,159 A * | 12/1998 | Collins | ................ | G06Q 20/382 380/30 |
| 5,991,519 A * | 11/1999 | Benhammou | ....... | G06F 12/1441 340/5.74 |
| 6,795,938 B2 * | 9/2004 | Harris | ................... | G06F 11/004 714/42 |
| 6,970,966 B2 * | 11/2005 | Gemelli | ............. | G06F 17/5045 710/305 |

(Continued)

OTHER PUBLICATIONS

Yu-Yuan Chen; Ruby B. Lee, "Hardware implementation of SP module with PAX cryptoprocessor", Princton University Technical Report, Apr. 2008.

*Primary Examiner* — Zachary A. Davis
(74) *Attorney, Agent, or Firm* — Brian D. Graham; Frank D. Cimino

(57) ABSTRACT

A real time, on-the-fly data encryption system is shown operable to encrypt and decrypt the data flow between a secure processor and an unsecure external memory system. Multiple memory segments are supported, each with its own separate encryption capability, or no encryption at all. Data integrity is ensured by hardware protection from code attempting to access data across memory segment boundaries. Protection is also provided against dictionary attacks by monitoring multiple access attempts to the same memory location.

18 Claims, 2 Drawing Sheets

(56) References Cited

U.S. PATENT DOCUMENTS

| | | | |
|---|---|---|---|
| 7,110,321 B1* | 9/2006 | Gibson | G11C 7/1006 |
| | | | 365/189.02 |
| 7,167,968 B2* | 1/2007 | Busaba | G06F 9/30025 |
| | | | 711/201 |
| 7,337,314 B2* | 2/2008 | Hussain | 713/151 |
| 7,406,581 B2* | 7/2008 | Southwell | G06F 9/3842 |
| | | | 710/3 |
| 7,779,252 B2 | 8/2010 | O'Brien et al. | |
| 8,234,459 B2* | 7/2012 | Gaither | G06F 12/0246 |
| | | | 711/103 |
| 9,058,260 B2* | 6/2015 | Dodson | G06F 11/0751 |
| 9,430,392 B2* | 8/2016 | Jain | G06F 12/0862 |
| 9,483,350 B1* | 11/2016 | Camp | G06F 11/1008 |
| 2006/0195907 A1 | 8/2006 | Delfs et al. | |
| 2012/0008768 A1* | 1/2012 | Mundra | H04L 9/0637 |
| | | | 380/28 |
| 2015/0026414 A1* | 1/2015 | Kalamatianos | G06F 12/0862 |
| | | | 711/137 |
| 2015/0278099 A1* | 10/2015 | Jain | G06F 12/0862 |
| | | | 711/137 |

\* cited by examiner

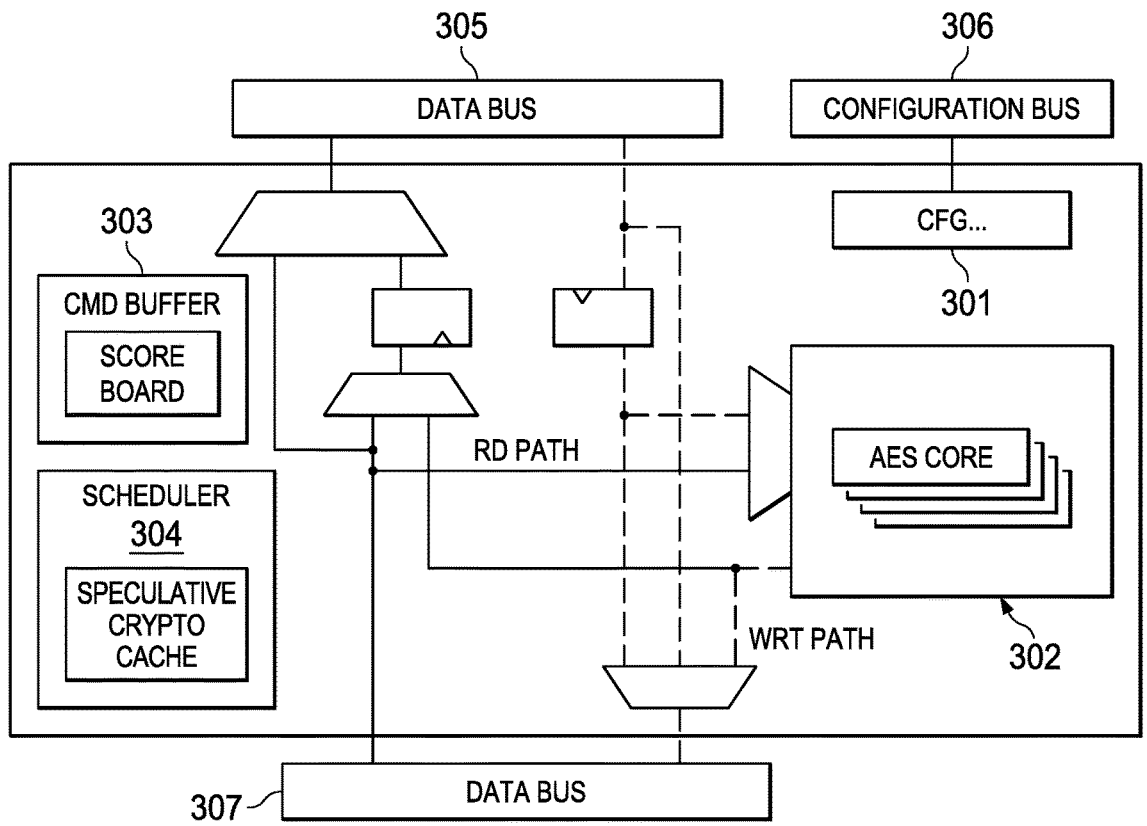
FIG. 3
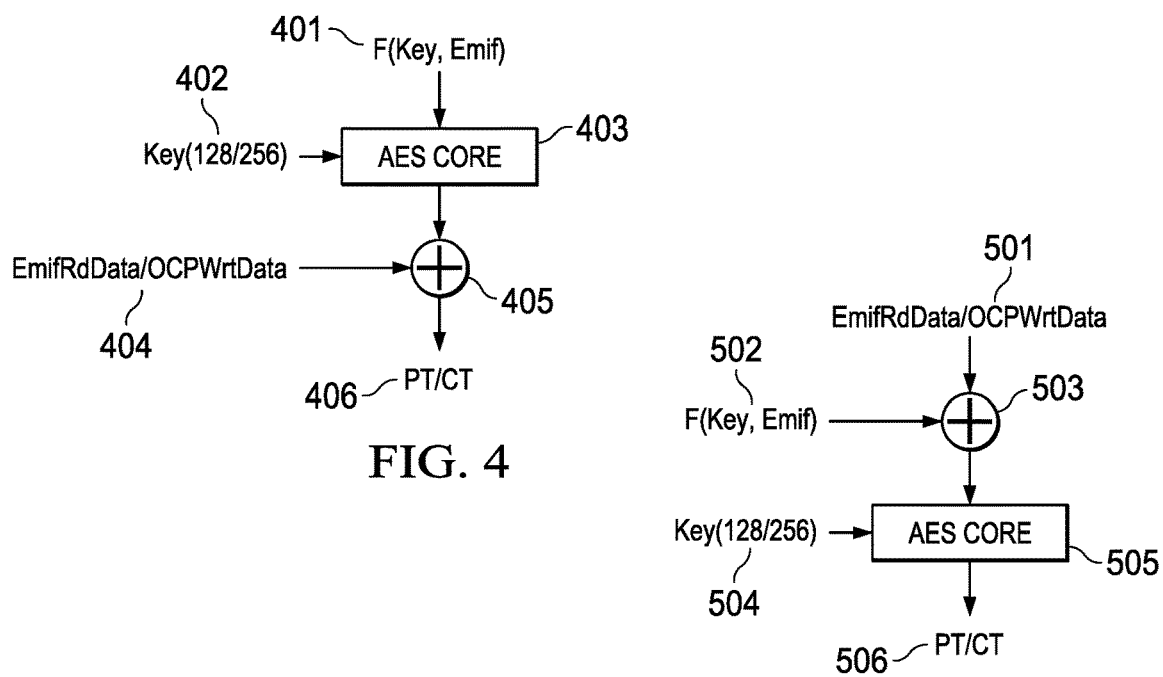
FIG. 4
FIG. 5

ововALL

HARDWARE PROTECTION OF INLINE CRYPTOGRAPHIC PROCESSOR

TECHNICAL FIELD OF THE INVENTION

The technical field of this invention is data encryption.

BACKGROUND OF THE INVENTION

Many emerging applications require physical security as well as conventional security against software attacks. For example, in Digital Rights Management (DRM), the owner of a computer system may be motivated to break the system security to make illegal copies of protected digital content.

Similarly, mobile agent applications require that sensitive electronic transactions be performed on untrusted hosts. The hosts may be under the control of an adversary who is financially motivated to break the system and alter the behavior of a mobile agent. Therefore, physical security is essential for enabling many applications in the Internet era.

Conventional approaches to build physically secure systems are based on building processing systems containing processor and memory elements in a private and tamper-proof environment that is typically implemented using active intrusion detectors. Providing high-grade tamper resistance can be quite expensive. Moreover, the applications of these systems are limited to performing a small number of security critical operations because system computation power is limited by the components that can be enclosed in a small tamper-proof package. In addition, these processors are not flexible, e.g., their memory or I/O subsystems cannot be upgraded easily.

Just requiring tamper-resistance for a single processor chip would significantly enhance the amount of secure computing power, making possible applications with heavier computation requirements. Secure processors have been recently proposed, where only a single processor chip is trusted and the operations of all other components including off-chip memory are verified by the processor.

To enable single-chip secure processors, two main primitives, which prevent an attacker from tampering with the off-chip untrusted memory, have to be developed: memory integrity verification and encryption. Integrity verification checks if an adversary changes a running program's state. If any corruption is detected, then the processor aborts the tasks that were tampered with to avoid producing incorrect results. Encryption ensures the privacy of data stored in the off-chip memory.

To be worthwhile, the verification and encryption schemes must not impose too great a performance penalty on the computation.

Given off-chip memory integrity verification, secure processors can provide tamper-evident (TE) environments where software processes can run in an authenticated environment, such that any physical tampering or software tampering by an adversary is guaranteed to be detected. TE environments enable applications such as certified execution and commercial grid computing, where computation power can be sold with the guarantee of a compute environment that processes data correctly. The performance overhead of the TE processing largely depends on the performance of the integrity verification.

With both integrity verification and encryption, secure processors can provide private and authenticated tamper resistant (PTR) environments where, additionally, an adversary is unable to obtain any information about software and data within the environment by tampering with, or otherwise observing, system operation. PTR environments can enable Trusted Third Party computation, secure mobile agents, and Digital Rights Management (DRM) applications.

ACRONYMS, ABBREVIATIONS AND DEFINITIONS

| Acronym | Definition |
|---|---|
| OTFA EMIF | On The Fly External Memory Interface |
| MAC | Message Authentication Code |
| GCM | Galois/Counter Mode |
| CCM | CBC-MAC + CTR |
| GHASH | Galois HASH |
| CBC-MAC | AES cipher-block chaining Message Authentication Code |
| AES | Advanced Encryption Standard |
| CTR | AES counter mode |
| ECB | AES electronic codebook mode |
| CBC | AES cipher-block chaining mode |

SUMMARY OF THE INVENTION

An on the fly encryption engine is shown that is operable to encrypt data being written to a multi segment external memory, and is also operable to decrypt data being read from encrypted segments of the external memory. The on the fly encryption engine intercepts memory operations attempting to access data across memory segments to insure memory integrity. Dictionary attacks are inhibited by monitoring and interrupting attempts to access the same memory locations multiple times.

BRIEF DESCRIPTION OF THE DRAWINGS

These and other aspects of this invention are illustrated in the drawings, in which:

FIG. 3 shows a high level block diagram of the on-the-fly encryption system,

FIG. 4 shows a block diagram of AES mode 0 processing, and

FIG. 5 is a block diagram of AES mode 1 processing.

DETAILED DESCRIPTION OF PREFERRED EMBODIMENTS

Figure 1:
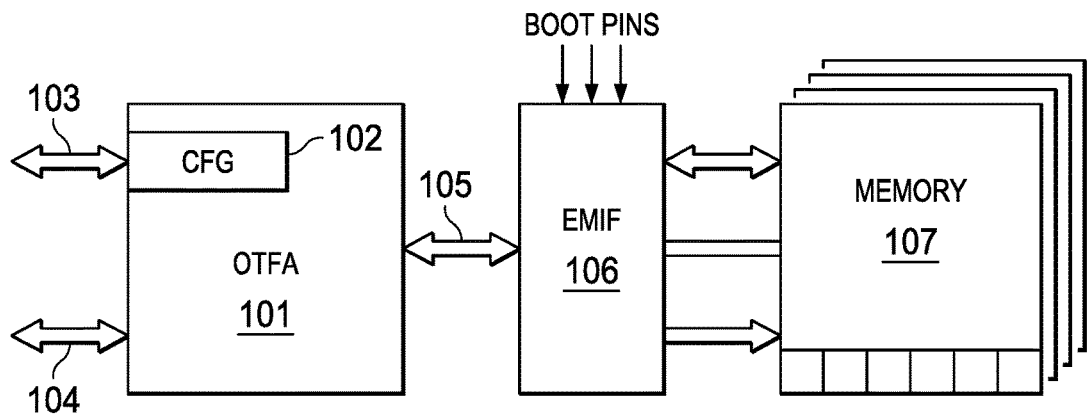
FIG. 1 shows a block diagram of the invention.

FIG. 1 shows the high level architecture of this invention. Block 101 is the on the fly encryption engine positioned between processor busses 103 and 104, and is connected to external memory interface 106 via bus 105. Configuration data is loaded into configuration register 102 via bus 103, and unencrypted data is written/read to block 101 via bus 104. Encrypted data is communicated to/from the External Memory Interface 106 via bus 105. External memory 107 is connected to and is controlled by External Memory Interface 106. External memory 107 may comprise multiple memory segments. These segments may be unencrypted or encrypted, and the segments may be encrypted with distinct and different encryption keys.

While there is no restriction on the method of encryption employed, the implementation described here is based on the Advanced Encryption Standard (AES).

AES is a block cipher with a block length of 128 bits. Three different key lengths are allowed by the standard: 128, 192 or 256 bits. Encryption consists of 10 rounds of processing for 128 bit keys, 12 rounds for 192 bit keys and 14 rounds for 256 bit keys.

Each round of processing includes one single-byte based substitution step, a row-wise permutation step, a column-wise mixing step, and the addition of the round key.

The order in which these four steps are executed is different for encryption and decryption.

The round keys are generated by an expansion of the key into a key schedule consisting of 44 4-byte words.

Figure 2:
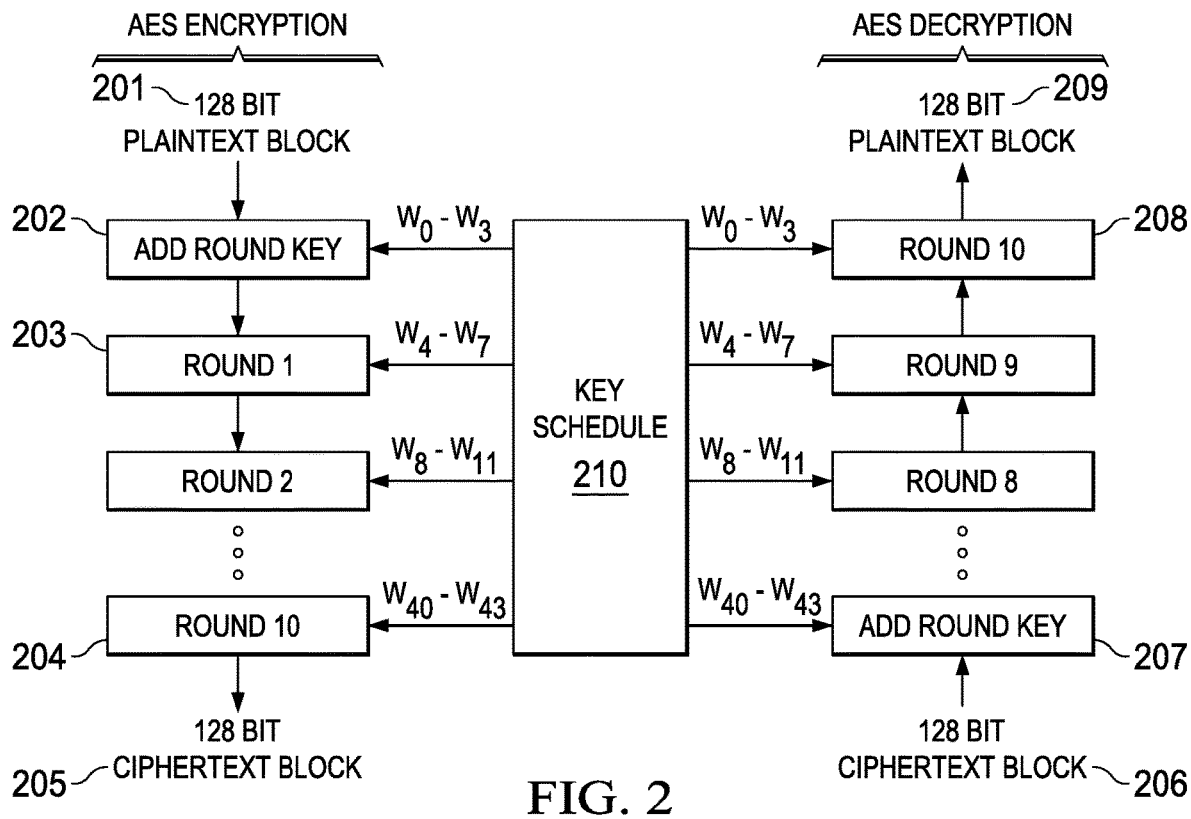
FIG. 2 is a high level flow chart of the AES encryption standard.

FIG. 2 shows the overall structure of AES using 128 bit keys. The round keys are generated in key scheduler 210. During encryption, 128 bit plain text block 201 is provided to block 202 where the first round key is added to plaintext block 201. The output of block 202 is provided to block 203 where the first round is computed, followed by rounds 2 through round 10 in block 204. The output of block 204 is the resultant 128 bit cipher text block 205.

During decryption the 128 bit cipher text block 206 is provided to block 207, where it is added to the last round key—the round key used by round 10 during encryption. This operation is followed by computing rounds 1 through 10 using the appropriate round keys in reverse order than their use during encryption. The output of block 208, round 10, is the 128 bit plain text block 209.

FIG. 3 is a high level block diagram of the on the fly encryption/decryption function. Plaintext to be encrypted during memory write operations is provided on data bus 305, with decrypted plaintext output on the same bus 305 during memory reads. Configuration data is provided on bus 306. Encrypted data bus 307 interfaces to the external memory controller.

Configuration data is input from bus 306 to the configuration block 301. AES core block 302 contains 12 AES cores and 6 GMAC cores which perform the cryptographic work.

This block performs the appropriate AES/GMAC/CBC-MAC operation defined by the scheduler.

Half of the AES and GMAC cores are assigned to RD (read) path and the other half to the WRT (write) path.

Since GMAC cores operate twice has fast as the AES cores, half as many are required.

The AES operations have 2 modes of operations called AES CTR and ECB+.

AES CTR is optimized for write once and read <n> times per unique Key update.

ECB+ is optimized for write <n> and read <n> times per unique Key update.

Command Buffer Block 303 tracks and stores all active transactions by accepting new transactions submitted on the data bus 305. Command Buffer Block 303 tracks the External Memory Interface (EMIF) responses to the submitted commands to the EMIF. With this information OTFA_EMIF has the ability to determine which command is associated with the EMIF response. This is required to determine which command and address are associated with the read data the EMIF is presenting.

Scheduler block 304 is the main control block which controls:
Data path routing
AES/MAC operations
Read/Modify/write operations
Data path routing is simple routing of the data sources for the AES operations. There are 2 possible data sources, the input write data and EMIF read data. Read data is required for read transactions or write transactions that require an internal read modify write operation.

The scheduler block will issue an internal Read Modify Write operation during the following conditions:
During ECB+ write operation when any of the byte enables are not active for each 16 Byte transfer, and
During write operation when MAC is enabled and the block being written is not a complete 32 Byte transfer.
The scheduler block will issue a modified Read command when accessing a MAC enabled region when the Read command is not a multiple of 32 Bytes. These operations are shown in Table 1.

TABLE 1

| System Transaction | Action |
| --- | --- |
| Write using ECB+ mode and not all 16 Bytes are enabled | On this first detection of a missing byte enable, OTFA will nullify all byte enables for the complete transaction, mask the EMIF response, issue a Read command to build the complete block, then create a new write data block and issue a new write command. The response of this new command will cause a response of the original write command |
| Write using MAC modes and not all 32 Bytes are enabled | Same as above |
| Read using MAC modes and size is not in multiples of 32 Bytes | The Read operation is extended to align to 32 Bytes. The system response will appear to be the original size. |

During encryption, the scheduler will first determine if the write address is in a Crypto Region. If not then the scheduler bypasses the Crypto Cores.

If the write address is a hit for Crypto operation, the scheduler determines the type of operation based on the Encryption mode and Authentication mode for that region.

The scheduler will then schedule the required Crypto tasks for the Crypto Cores to implement the determined type of operation including the HASH calculation.

The scheduler checks to see if a read/modify/write is required, then schedules an appropriate command.

During decryption the scheduler will first determine if this the read address is in a Crypto Region. If not then the scheduler bypasses the Crypto Cores.

If the read address is a hit for Crypto operation, the scheduler determines the type of operation based on the Encryption mode and Authentication mode for that region.

Based on this information the scheduler will determine if it can start an early Crypto operation before the command is sent to the memory and before the read data is returned by the memory. This early operation enables high performance since the Crypto operation is started before the read data is sent back.

Also, the scheduler will check the HASH CACHE to determine if the determined type of operation is a HIT. If the determined type of operation is a MISS the scheduler will issue a HASH read before the read command is sent.

When the RD DATA is sent back to bus 305, a Scoreboard is used to determine which command it was associated with. This allows out of order commands to the external memory and out of order read data from the memory.

Once the read data arrives, the data will get sent to the Crypto Cores for processing.

For some types of Crypto Operations a Speculative Read Crypto operation can start when the Read command is sent to the Memory System. The result of this operation is stored in a Speculative Read Crypto Cache which enables an out of order response from the Memory System.

The Crypto Cores are a set of cores which can get used by encryption or decryption operations. The interface is simple, similar to a FIFO with backpressure. If read traffic is 50% and write traffic is 50%, then the allocation can be balanced. If write traffic is higher, more Crypto Cores may be allocated to the write traffic.

This can get done by a static allocation, such as a 60% to 40% split. It can get done by a dynamic allocation to adapt to the current traffic patterns. This will insure the maximum utilization of the Crypto Cores.

The region checking function will verify that a command will not cross memory regions. If regions are crossed the command will be blocked. For WR DATA the region checking function will null all byte enables. For RD DATA the region checking function will force zero on all DATA. A secure Error event is sent to the kernel. This prevents bad or malicious code from corrupting a secure area or getting access to a secure area.

The dictionary checker function will verify that the command is not doing a Dictionary attack by accessing the same memory location multiple times. If the command violates these rules the dictionary checker function will block the WR command from issuing a Crypto Operation and will null all byte enables. A secure Error event is sent to the kernel. This prevents bad or malicious code from determining the Crypto Keys used making the brute force attack the only possible method to break the encryption.

AES block 302 requires the following inputs:
Address of data word from the command or calculated for a burst command,
AES mode along with the Key size, Key and Initialization Vector (IV), and
Read or Write transaction type.

The AES operation produces an encrypted or decrypted data word.

The MAC operation produces a MAC for Read and Write operations.

Table 2 defines the possible combinations of Encryption modes and Authentication modes. A total of 9 combinations are allowed. Note GCM is AES-CTR+GMAC and CCM is AES-CTR+CBC-MAC.

TABLE 2

| Authentication modes | Encryption modes | | |
| --- | --- | --- | --- |
| | Disable | AES-CTR | AES-ECB+ |
| Disable | Supported | Supported | Supported |
| GMAC | Supported | Supported | Not Supported |
| CBC-MAC | Not Supported | Supported | Not Supported |

FIG. 4 illustrates an embodiment of this invention performing a first mode of the Advanced Encryption Standard, designated AES mode 0. The inputs to AES core 403 are the Input data 401 generated by scheduler 304 and the encryption/decryption key 402. The output of AES core 403 and the EMIF read data during decryption or the bus write data during encryption (EMIFRdData/OCPWrtData 404) is combined by Exclusive Or block 405. The output of 405 is either cipher text during encryption, or plain text during decryption (PT/CT 406). AES mode 0 does not require a Read Modify Write operation.

FIG. 5 illustrates an embodiment of this invention performing a first mode of the Advanced Encryption Standard, designated AES mode 1. 501 read data from the EMIF during decryption or write data from the bus during encryption is combined in XOR block 503 with the data 502 generated by scheduler 304. The output of the XOR block 503 is input to AES core 505, together with the encryption or decryption key 504. Output 506 of the AES core 505 is plain text during decryption, or cipher text during encryption.

What is claimed is:

1. A data encryption system comprising:
an encryption engine comprising a plurality of encryption cores each configured to perform at least one of an encryption function, a decryption function, or a message authentication function;
an external memory comprising a set of memory regions that include a first memory region for storing encrypted data and a second memory region for storing unencrypted data; and
an external memory interface configured to write encrypted data received from the encryption cores to the external memory, and further configured to provide encrypted data received from the external memory to the encryption cores;
wherein the encryption engine further comprises circuitry configured to perform a region checking function to:
identify whether a memory write access command attempts to cross a memory region boundary by accessing the first memory region and the second memory region; and
when the memory write access command attempts to cross the memory region boundary:
inhibit execution of the identified memory write access command so that write data corresponding to the identified memory write access command is prevented from being written to any location in the external memory; and
generate an error condition.

2. The data encryption system of claim 1, wherein the encryption engine further comprises:
circuitry configured to perform a dictionary checker function to:
identify whether any memory read access command issued to the external memory interface is one of multiple accesses to the same memory location; and
when a memory read access command is identified as being one of multiple accesses to the same memory location:
inhibit the execution of the identified memory read access command to prevent malicious code from accessing a secure area of the external memory; and
generate an error condition.

3. The data encryption system of claim 2, wherein:
the circuitry to perform the dictionary checker function is further configured to:
inhibit execution of the identified memory read access command by forcing all read data to zero.

4. The data encryption system of claim 1, wherein the execution of the identified memory write access command is inhibited by forcing all write byte enables to a null value.

5. The data encryption system of claim 1, wherein the encryption engine further includes a command buffer and is configured to:
receive a memory read access command;
store the memory read access command in the command buffer;

provide the memory read access command to the external memory via the external memory interface;

receive a set of read data from the external memory; and determine, based on the memory read access command stored in the command buffer, that the set of read data is associated with the memory read access command.

6. The data encryption system of claim 5, wherein the region checking function includes:

identifying whether the memory read access command attempts to cross the memory region boundary by accessing the first memory region and the second memory region; and when the memory read access command attempts to cross the memory region boundary, inhibiting execution of the memory read access command.

7. The data encryption system of claim 6, wherein the region checking function includes inhibiting the execution of the memory read access command by forcing the set of read data to zero when the memory read access command attempts to cross the memory region boundary.

8. The data encryption system of claim 1, wherein the encryption engine is configured to encrypt the encrypted data of the first memory region using AES-128 encryption.

9. A computing system comprising:

an encryption engine that includes at least one encryption processing core;

an external memory that includes a first region for storing encrypted data and a second region for storing unencrypted data; and an external memory interface configured to write encrypted data received from the encryption engine to the external memory;

wherein the encryption engine further includes circuitry configured to perform a region checking function to:

determine whether a memory write access command issued to the external memory interface attempts to cross a boundary between the first region and the second region by writing to the first region and the second region; and upon a determination that the memory write access command attempts to cross the boundary, inhibit execution of the memory write access command so that write data corresponding to the memory write access command is prevented from being written to any location in the external memory.

10. The computing system of claim 9, wherein the external memory is divided into a plurality of memory segments and each of the first and second regions contains at least one of the memory segments.

11. The computing system of claim 10, wherein the first region contains two or more memory segments, and wherein each memory segment in the first region is encrypted using a different respective encryption key.

12. The computing system of claim 10, wherein memory segments contained in the first region are encrypted using AES-128 encryption.

13. The computing system of claim 9, wherein the encryption engine further includes a command buffer and is configured to:

receive a memory read access command;

store the memory read access command in the command buffer; and determine, using the command buffer, that a set of read data received from the external memory is associated with the memory read access command.

14. The computing system of claim 13, wherein the region checking function performed by the circuitry includes:

determining whether the memory read access command attempts to cross the boundary between the first region and the second region by reading from the first region and the second region; and upon a determination that the memory read access command attempts to cross the boundary, inhibiting execution of the memory read access command.

15. The computing system of claim 14, wherein the region checking function includes inhibiting the execution of the memory read access command by setting the set of read data to zero.

16. A computing system comprising:

an encryption engine that includes at least one encryption processing core;

an external memory divided into a plurality of memory regions that include a first memory region for storing encrypted data and a second memory region for storing unencrypted data; and an external memory interface configured to write encrypted data received from the encryption engine to the external memory and to provide encrypted data received from the external memory to the encryption engine;

wherein the encryption engine further includes circuitry configured to perform a region checking function to:

determine whether a memory write access command issued to the external memory interface attempts to cross a boundary between the first memory region and the second memory region by accessing the first memory region and the second memory region;

upon a determination that the memory write access command attempts to cross the boundary, inhibit execution of the memory write access command so that write data corresponding to the memory write access command is prevented from being written to any location in the external memory;

determine whether a first memory read access command issued to the external memory interface attempts to cross the boundary between the first memory region and the second memory region by accessing the first memory region and the second memory region; and upon a determination that the first memory read access command attempts to cross the boundary, inhibit execution of the memory read access command.

17. The computing system of claim 16, wherein the encryption engine further includes a command buffer and is configured to:

receive a second memory read access command;

store the second memory read access command in the command buffer; and determine, using the command buffer, that a set of read data received from the external memory is associated with the second memory read access command.

18. The computing system of claim 17, wherein the region checking function includes inhibiting the execution of the memory read access command by setting the set of read data to zero.

* * * * *